United States Patent
Avadhanam et al.

(10) Patent No.: US 8,983,223 B2
(45) Date of Patent: Mar. 17, 2015

(54) LOW-COMPLEXITY BILATERAL FILTER (BF) IMPLEMENTATION IN A DATA PROCESSING DEVICE

(71) Applicant: NVIDIA Corporation, Santa Clara, CA (US)

(72) Inventors: Niranjan Avadhanam, Karnataka (IN); Prashant Sohani, Marharashtra (IN)

(73) Assignee: NVIDIA Corporation, Santa Clara, CA (US)

( * ) Notice: Subject to any disclaimer, the term of this patent is extended or adjusted under 35 U.S.C. 154(b) by 48 days.

(21) Appl. No.: 13/948,210

(22) Filed: Jul. 23, 2013

(65) Prior Publication Data

US 2015/0030257 A1    Jan. 29, 2015

(51) Int. Cl.
G06K 9/40 (2006.01)
G06T 5/00 (2006.01)

(52) U.S. Cl.
CPC .............. *G06T 5/002* (2013.01); *G06T 5/003* (2013.01)
USPC ........... 382/260; 382/261; 382/262; 382/263; 382/264; 382/265

(58) Field of Classification Search
USPC ......... 382/260, 261, 262, 263, 264, 265, 141, 382/159; 345/441, 428, 473, 690, 102; 348/E5.028; 381/71.1, 71.12, 71.14; 362/574, 553, 556
See application file for complete search history.

(56) References Cited

U.S. PATENT DOCUMENTS

| | | | | |
|---|---|---|---|---|
| 5,774,130 A * | 6/1998 | Horikawa et al. | ............. | 345/441 |
| 6,631,207 B2 | 10/2003 | Hirota et al. | | |
| 7,466,871 B2 | 12/2008 | Hosoda et al. | | |
| 8,057,083 B2 * | 11/2011 | Harris | ............. | 362/574 |
| 8,184,819 B2 * | 5/2012 | Malvar et al. | ............. | 381/71.1 |
| 8,285,026 B2 * | 10/2012 | Dirix et al. | ............. | 382/141 |
| 8,285,033 B2 | 10/2012 | Das Gupta et al. | | |
| 8,335,394 B2 | 12/2012 | Zhu et al. | | |
| 2013/0003832 A1 | 1/2013 | Li et al. | | |

FOREIGN PATENT DOCUMENTS

| | | | | |
|---|---|---|---|---|
| GB | 2278750 | * | 12/1994 | ............. H04N 7/12 |
| WO | 2012005947 A2 | | 1/2012 | |

* cited by examiner

*Primary Examiner* — Anh Do
(74) *Attorney, Agent, or Firm* — Zilka-Kotab, PC

(57) ABSTRACT

A method includes implementing, through a processor communicatively coupled to a memory and/or a hardware block, a Bilateral Filter (BF) including a spatial filter component and a range filter component, and implementing the spatial filter component with a low-complexity function to allow for focus on the range filter component. The method also includes determining, through the processor, filter tap value(s) related to the range filter component as a function of radiometric distance between a pixel of a video frame and/or an image and other pixels thereof based on a pre-computed corpus of data related to execution of an application in accordance with a filtering requirement of the pixel by the application. Further, the method includes constraining, through the processor, the filter tap value(s) to a form ixbase based on the BF implementation. i is an integer and base is a floating point base.

20 Claims, 5 Drawing Sheets

LOW-COMPLEXITY BILATERAL FILTER (BF) IMPLEMENTATION IN A DATA PROCESSING DEVICE

FIELD OF TECHNOLOGY

This disclosure relates generally to video/image filtering and, more particularly, to a low-complexity bilateral filter (BF) implementation in a data processing device.

BACKGROUND

A data processing device such as a mobile device (e.g., a mobile phone, a tablet) may have a low processing capability associated therewith. A user of the data processing device may view video data thereon. Video frames of the video data may include edges therein. An edge may be a portion of a video frame around which there is a change in image intensity level above a threshold value. For edge preservation, the data processing device may include a bilateral filter (BF) implemented in a post-processing engine executing on a processor thereof. The BF may be represented as a product of two Gaussian functions, viz. a spatial Gaussian function and a range Gaussian function, divided by a normalization factor. The complexity of the BF representation may not be conducive to execution of the post-processing engine on the data processing device. Thus, the user may be able to enjoy only limited capabilities provided through the post-processing engine.

SUMMARY

Disclosed are a method, a device and/or a system of a low-complexity bilateral filter (BF) implementation in a data processing device.

In one aspect, a method includes implementing, through a processor communicatively coupled to a memory and/or a hardware block, a Bilateral Filter (BF) including a spatial filter component and a range filter component, and implementing, through the processor and/or the hardware block, the spatial filter component with an appropriate function having reduced complexity compared to a Gaussian function to allow for focus on the range filter component. The method also includes determining, through the processor, filter tap value(s) related to the range filter component as a function of radiometric distance between a pixel of a video frame and/or an image and other pixels thereof based on a pre-computed corpus of data related to execution of an application in accordance with a filtering requirement of the pixel by the application.

Further, the method includes constraining, through the processor, the filter tap value(s) to a form i×base to further reduce complexity of filtering of the pixel based on the BF implementation. i is an integer and base is a floating point base.

In another aspect, a data processing device includes a memory, and a processor communicatively coupled to the memory. The processor is configured to execute instructions to implement a BF including a spatial filter component and a range filter component, and instructions to implement the spatial filter component with an appropriate function having reduced complexity compared to a Gaussian function to allow for focus on the range filter component. The processor is also configured to execute instructions to determine filter tap value(s) related to the range filter component as a function of radiometric distance between a pixel of a video frame and/or an image and other pixels thereof based on a pre-computed corpus of data related to execution of an application in accordance with a filtering requirement of the pixel by the application.

Further, the processor is configured to execute instructions to constrain the filter tap value(s) to a form i×base to further reduce complexity of filtering of the pixel based on the BF implementation. i is an integer and base is a floating point base.

In yet another aspect, a system includes a server and/or a storage medium including pre-computed corpus data related to execution of an application. The system also includes a data processing device communicatively coupled to the server and/or the storage medium. The data processing device includes a processor communicatively coupled to a memory. The processor is configured to execute instructions to implement a BF including a spatial filter component and a range filter component, and instructions to implement the spatial filter component with an appropriate function having reduced complexity compared to a Gaussian function to allow for focus on the range filter component.

The processor is also configured to execute instructions to determine filter tap value(s) related to the range filter component as a function of radiometric distance between a pixel of a video frame and/or an image and other pixels thereof based on the pre-computed corpus of data in accordance with a filtering requirement of the pixel by the application. Further, the processor is configured to execute instructions to constrain the filter tap value(s) to a form i×base to further reduce complexity of filtering of the pixel based on the BF implementation. i is an integer and base is a floating point base.

The methods and systems disclosed herein may be implemented in any means for achieving various aspects, and may be executed in a form of a non-transitory machine-readable medium embodying a set of instructions that, when executed by a machine, cause the machine to perform any of the operations disclosed herein.

Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, a device, and/or a system of a low-complexity bilateral filter (BF) implementation in a data processing device. Although the present embodiments have been described with reference to specific example embodiments, it will be evident that various modifications and changes may be made to these embodiments without departing from the broader spirit and scope of the various embodiments.

Figure 1:
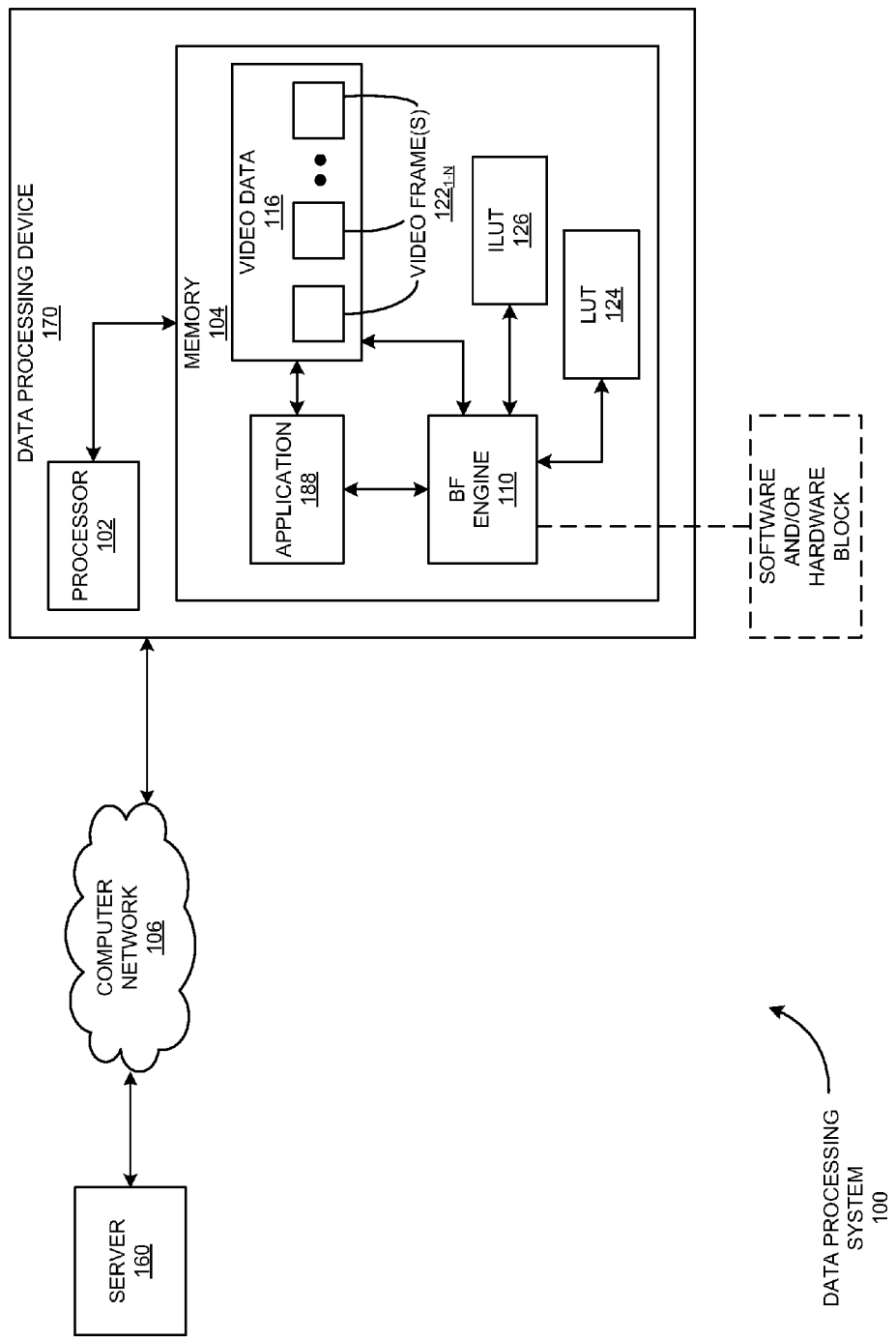
FIG. 1 is a schematic view of a data processing system, according to one or more embodiments.

FIG. 1 is a schematic diagram of a data processing system 100, according to one or more embodiments. In one or more embodiments, data processing system 100 may include one or more server(s) (e.g., server 160) and one or more data processing device(s) (e.g., data processing device 170) configured to utilize the services provided through the one or more server(s) (e.g., through a computer network 106 such as Internet, a Wide Area Network (WAN) and a Local Area Network (LAN)). Alternately, in one or more embodiments, data processing system 100 may merely include data processing device 170 and processing/optimization of data to be discussed herein may be performed locally therethrough. In one or more embodiments, data processing device 170 may be a desktop computer, a laptop computer, a notebook computer, a netbook or a mobile device such as a tablet or a mobile phone. Other forms of data processing device 170 are within the scope of the exemplary embodiments discussed herein.

In one or more embodiments, data processing device 170 may include a processor 102 (e.g., a Central Processing Unit (CPU), a Graphics Processing Unit (GPU)) communicatively coupled to a memory 104 (e.g., a volatile memory and/or a non-volatile memory); memory 104 may include storage locations addressable through processor 102. In one or more embodiments, data processing device 170 and/or server 160 may be employed in one or more applications such as video enhancement, camera noise reduction, video coding artifact reduction, video abstraction and optical flow estimation. In order to cater to the filtering requirements of image/video processing associated with the aforementioned one or more embodiments, a bilateral filter (BF) may be implemented in data processing device 170. Specifically, in the case of data processing device 170 being a mobile device, the BF may be used both during video capture and video playback.

Video frames processed through data processing device 170 may include edges therein. An edge may be a point of a video frame around which there is a change in image intensity level above a threshold value. As the edge defines a boundary of transition between image intensity levels, the edge may be a feature of the video frame worth preserving during filtering. Although the edge-preserving capability of the BF is extremely useful, the BF may provide for high complexity of processing due to a non-linear nature thereof. The high complexity may not be conducive to the implementation of the BF (FIG. 1 shows a BF engine 110 to be executed through processor 102 as being stored in memory 104; BF engine 110 may include the requisite set of instructions to provide the functionalities associated with the BF) in a power-constrained data processing device 170 such as a mobile device. Similarly, the non-linear adaptive BF may incur silicon cost when implemented as a hardware block associated with data processing device 170.

An output of an example BF implemented in data processing device 170 for the edge preservation discussed above may generically be represented as:

$$BF[I]_p = \frac{1}{w_p} \sum_{q \in S} G_{\sigma_s}(\|p - q\|) G_{\sigma_r}(|I_p - I_q|) I_q \qquad (1)$$

In words, for an input video frame $122_{1-N}$ I of video data 116 (exemplary embodiments discussed herein are also applicable to image data) shown as being stored in memory 104, the output $BF[I]_p$ for a pixel p may be expressed as example Equation (1). Here, $\sigma_s$ and $\sigma_r$ are the spatial deviation and the radiometric deviation respectively; $G_{\sigma_s}$ is a Gaussian function associated with spatial pixel location (spatial filter portion) and $G_{\sigma_r}$ is a Gaussian function associated with pixel intensity (range filter portion); and the normalization factor $W_p$ is given by:

$$W_p = \sum_{q \in S} G_{\sigma_s}(\|p - q\|) G_{\sigma_r}(|I_p - I_q|) \qquad (2)$$

The normalization factor may ensure that filter weights for all pixels add up to 1. Thus, the weights of the BF may depend on both the spatial Gaussian function and the range Gaussian function. The BF may be adapted by varying $\sigma_s$ and/or $\sigma_r$. The BF is known to one skilled in the art; therefore, detailed discussion of concepts associated therewith has been skipped for the sake of brevity and clarity.

The Gaussian exponential functions in example Equations (1) and (2) may contribute to computational complexity of the BF. Although Gaussian functions discussed above may predominantly be used to represent the spatial filter portion and the range filter portion of the BF, the general representation of the BF allows for a more expanded family of functions to be utilized. Exemplary embodiments exploit the possibility of a reduction in complexity of the BF implementation, as will be discussed below.

The basic BF implementation may be separated into the spatial filter portion, the range filter portion and a normalization portion, as seen in example Equation (1). To generalize the formulation of the BF, example Equations (1) and (2) may be rewritten as example Equations (3) and (4)

$$BF[I]_p = \frac{1}{w_p} \sum_{q \in S} F_{\sigma_s}(\|p - q\|) F_{\sigma_r}(|I_p - I_q|) I_q \qquad (3)$$

$$W_p = \sum_{q \in S} F_{\sigma_s}(\|p - q\|) F_{\sigma_r}(|I_p - I_q|) \qquad (4)$$

Here, $F_{\sigma_s}$ is a general function (e.g., Gaussian, non-Gaussian) associated with spatial pixel location and $G_{\sigma_r}$ is a general function (e.g., Gaussian, non-Gaussian) associated with pixel intensity (range).

Figure 2:
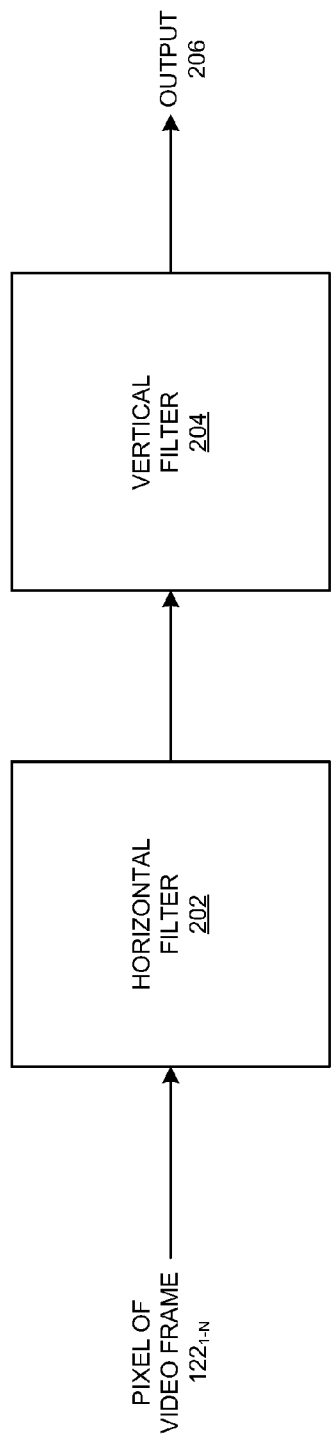
FIG. 2 is a schematic view of separability of a Bilateral Filter (BF) implementation in a data processing device of the data processing system of FIG. 1 into a horizontal filter and a vertical filter, according to one or more embodiments.

In one or more embodiments, the generalized formulation of the BF as including a spatial filter portion and a radiometric/range filter portion may render the BF amenable to a separable implementation, at least with respect to the spatial filter portion, to increase computational speed of the filtering. In other words, in one or more embodiments, the spatial filter portion of the BF may be applied across one spatial dimension (e.g., say, x-axis) and the intermediate output may then be filtered in other spatial dimension(s) (e.g., in the case of a two-dimensional (2D) image, the other dimension is a dimensional perpendicular to the x-axis, viz. y-axis). FIG. 2 shows the separability of the BF implementation into a horizontal filter 202 (e.g., x-axis) and a vertical filter 204, according to one or more embodiments.

In addition, in one or more embodiments, the envelope of the spatial filter portion may be simplified into a rectangular function to allow for the focus to be solely on the radiometric/range filter portion. In one or more embodiments, even in the case of the range filter portion, a Lookup table (LUT) (e.g., LUT 124 stored in memory 104 or implemented in a hardware block associated with data processing device 170) may be utilized to pre-compute and store function values for various radiometric distances. Thus, in the simplest form, the spatial filter portion corresponding to horizontal filter 202 may be a 1×N rectangular filter (N being a positive integer). It should be noted that non-Gaussian non-complex functions other than the simple rectangular function may be utilized instead. For example, in certain applications of the BF, a series of rectangular functions may be utilized in the spatial filter portion.

The LUT 124 based approach discussed above may be based on picking a pre-calculated filter tap value from LUT 124 for a corresponding radiometric difference $|I_p-I_q|$; here, pixels close in intensity levels to a current pixel may be associated with higher weights/filter tap values, thereby contributing to reduction in noise due to diffusion of edges. In one or more embodiments, the filter tap values may be static due to computation thereof in advance. In an example case of an 8-bit video frame $122_{1-N}$, entries of LUT 124 may vary from 0 to 255. For each value obtained, the filter output may have to be calculated and divided by the normalization factor. Exemplary embodiments provide for a means to dispense with the aforementioned division, as will be discussed below.

In one or more embodiments, following the accomplishment of the range filter operation through LUT 124 and the normalization operation, a filtered output of the aforementioned set of operations may be applied to a vertical filter 204 to produce a final output (e.g., output 206) as the filtered video frame. In the abovementioned example of the spatial filter portion being initiated through a 1×N rectangular filter, vertical filter 204 may be an appropriate N×1 rectangular filter.

In one or more embodiments, the range filter portion may also be simplified through a novel technique to compute candidate tap values thereof. Although the filter tap values can be computed through simplifying an exponential function to various extents, exemplary embodiments provide for a novel technique to utilize application specific data for computing cluster(s) that best describe the prospective candidate tap values of the range filter portion. FIG. 1 shows an application 188 executing on data processing device 170. In one or more embodiments, data processing device 170 may have a history of execution of application 188 associated therewith. In one or more embodiments, said history of execution may generate enough data suitable for clustering. Portions of the generated data may have also been run through exponential (and/or non-exponential) forms of the function implementation representing the range filter portion. In one or more embodiments, by clustering the aforementioned data to choose the best suited candidate filter tap values, the complexity of the normalization portion of the BF implementation may also be reduced.

In one or more embodiments, the centroids of the abovementioned clusters may be the potential candidate filter tap values. Further, in one or more embodiments, through restricting the aforementioned centroids and, hence, the potential candidate filter tap values to a form i×base (where i is an integer and base is a floating point base), the normalization operation may be restricted to a simple integer division (the floating point base portion may be dispensed with due to presence thereof in a numerator and a denominator of the BF output equation). In one or more embodiments, steering the centroids of the clusters toward specific filter tap values may be put forth as an optimization problem subject to a set of constraints as:

$$\underset{\{i\},base}{\operatorname{argmin}} \|C - \hat{C}(\{i\} \times base)\|^p, \{i\} \in \mathbb{Z}, base \in \mathbb{R} \quad (5)$$

In example optimization (5), C is the set of centroids found through clustering, $\hat{C}$ is the new filter realized from the clustering that is representable as an integer multiple of the floating point base, $\{i\} \times base$. Example optimization (5) may solve for a set of $\{i\} \times base$ for which $\|C-\hat{C}(\{i\} \times base)\|^p$ is at a minimum value thereof. p is a suitable index to which $\|C-\hat{C}(\{i\} \times base)\|$ is raised. If required, further constraints may be imposed on the set of integers $\{i\}$; for example, the candidate filter tap values may be made to be bit-shift friendly (to be discussed below). It should be noted that the clustering operation and/or the steering of the centroids may be performed as pre-processing operation(s); the aforementioned pre-processing operation(s) may not affect the low-complexity filtering implemented through BF engine 110 executing on data processing device 170.

In one or more embodiments, restriction of a length of the potential candidate tap values to an appropriate number may also restrict a size of an inverse lookup table (e.g., ILUT 126 stored in memory 104; ILUT 126 is to account for the normalization operation). Thus, in one or more embodiments, an ultra-low complex BF filter may be realized through BF engine 110.

In one or more embodiments, as mentioned above, the candidate filter tap values may be steered to be amenable to bit-shifting to further reduce the complexity of the BF implementation. The reduction in complexity may include dispensing with computationally expensive operations such as multiplication and division. In the case of data processing device 170 including a low-end processor 102, the aforementioned reduction in complexity may be critical. It should be noted that the functions discussed herein with respect to the range filter portion and/or the spatial filter portion are mere examples; exemplary embodiments provide for flexibility in the choices therein; all low-complexity candidate BFs that maintain the edge-preserving nature of the traditional BF are within the scope of the exemplary embodiments discussed herein.

In one or more embodiments, to optimize the amount of space consumed by ILUT 126, bit locations associated with entries thereof may be fully utilized. In one or more embodiments, each inverse value of an integer i may be stored in ILUT 126 in the form ($2^k$/i also being an integer). In one or more embodiments, k may be chosen such that as many significant bits of the inverse value may be stored in ILUT 126. In one or more embodiments, $2^k$ may then be bit-shifted later. In one or more embodiments, companding may be implemented to store both k and a set of $2^k$ and i (and/or $2^k$/i) in ILUT 126. For example, when ILUT 126 includes 8-bit entries, the first 5 bits of each entry may be related to the 5 significant bits of the mantissa/significand; the last 3 bits may be related to the value of k, and may indicate the number of bit-shifts required. It should be noted that the choice of the number of bits is not limited to 8. Depending on the precision requirements of application 188, the number of bits may exceed 8 or be less than 8.

In an example scenario, the intensity level for a current pixel may be 150 and the intensity level for a preceding pixel 100. The $|I_p-I_q|$ of 50 may be looked up in LUT 124 and the appropriate filter tap value(s) selected. As discussed above, the filter tap value(s) may be chosen through the clustering process. The clustering process may also restrict a number of appropriate filter tap value(s) to a small number that further reduces the size of LUT 124; search space in LUT 124 may also be reduced. Further, if the constraints deem that the number of appropriate filter tap value(s) is, say, 11 and that the floating point base (base) is 1.25, the aforementioned filter tap value(s) may be 0, 1.25, 2.5 and so on. Wherever filtering is done in video frame $122_{1-N}$, the associated filter tap value(s) may only be combination(s) of the aforementioned values. In the case of looking up a number with an infinitely repeating decimal through ILUT 126, a maximum number of significant bits of the repeating decimal may be incorporated in an entry of ILUT 126 to ensure that the filter computation is as accurate as possible.

Exemplary embodiments may also be explained in terms of catering to a particular application 188. Consider a video capturing application on a mobile phone (example data processing device 170) where sensor noise in low light conditions is a major issue impacting quality. Here, exemplary embodiments allow for computation of optimal yet low-complexity filters by clustering data generated at various lighting conditions. Thus, a small set of candidate range filter tap values may be generated, which directly results in extremely fast lookup operation(s) from ILUT 126 and, thereby, computation of the final filter values. The low complexity involved herein enables the BF to be used in power-constrained applications.

Figure 3:
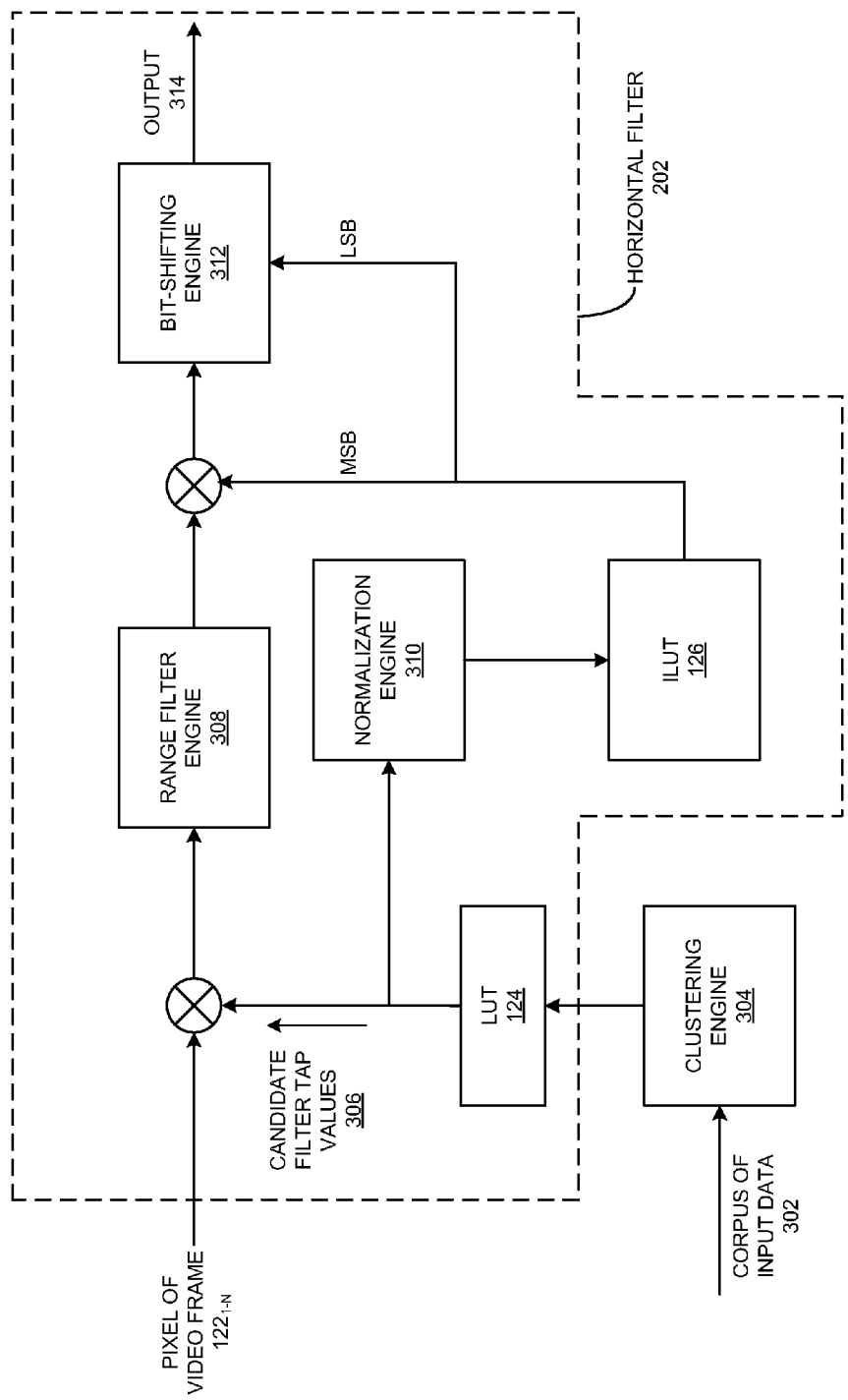
FIG. 3 is a schematic view of an implementation of the horizontal filter of FIG. 2, according to one or more embodiments.

FIG. 3 summarizes the implementation of horizontal filter 202, according to one or more embodiments. In one or more embodiments, horizontal filter 202 may have a corpus of input data 302 that is utilized during the clustering discussed above; the clustering may be a pre-computing process. In one or more embodiments, for a pixel of an input video frame $122_{1-N}$, LUT 124 may be searched (e.g., through the execution of BF engine 110 on processor 102) utilizing radiometric distances between the pixel and other pixels as an index to determine the potential candidate filter tap values. As discussed above, in one or more embodiments, clustering engine 304 may enable the choice of the best candidate filter tap values (e.g., candidate filter tap values 306) from LUT 124. In one or more embodiments, candidate filter tap values 306 may be fed to a range filter engine 308 that executes the range filter portion operations associated with example Equation (3). Further, in one or more embodiments, candidate filter tap values 306 may be fed to a normalization engine 310 that executes the normalization operations associated with example Equation (3).

In one or more embodiments, normalization engine 310 may leverage ILUT 126 that includes entries stored in the form $2^k/i$. In one or more embodiments, data related to the most significant bits (MSB) of the entry may be combined with the output of range filter engine 308; the subsequent output may be bit-shifted (e.g., through bit-shifting engine 312) as indicated by the least significant bits (LSB) of the entry. Said bit-shifting may account for dispensing with the division by the normalization factor in example Equation (3). In one or more embodiments, the final output (e.g., output 314) of horizontal filter 202 may then be filtered through vertical filter 204 to arrive at output 206.

It should be noted that LUT 124 and ILUT 126 may be implemented in a same table; further, LUT 124 and/or ILUT 126 may be implemented in hardware and/or software. Also, lookup tables are merely shown for the sake of example purposes. Alternate implementations such as executing fetching operations of "entries" directly from memory 104 are within the scope of the exemplary embodiments discussed herein.

Clustering engine 304 may execute on server 160; alternately, clustering engine 304 may execute on data processing device 170. In one example embodiment, server 160 may provide the clustering as a service to data processing device 170. An example implementation of clustering through clustering engine 304 may involve k-means clustering; other forms of clustering may also be implemented therein. All reasonable modifications, implementations and/or applications are within the scope of the exemplary embodiments discussed herein.

It should be noted that while the clustering discussed herein is effectively utilized to steer the centroid(s) to filter tap value(s), other ways of determining the filter tap value(s) of the form i×base based on corpus of input data 302 are within the scope of the exemplary embodiments discussed herein. Further, while BF engine 110, LUT 124 and ILUT 126 are preferentially shown as part of data processing device 170 to address latency-critical applications, BF engine 110, LUT 124 and/or ILUT 126 may also be part of server 160. In the case of the computing platform of server 160 being virtualized to serve multiple client devices (e.g., data processing device 170), the low-complexity execution of BF engine 110 on server 160 may enable improved quality of service therefrom. Also, the aforementioned modification dispenses with issues related to server 160 being a low-end device.

Figure 4:
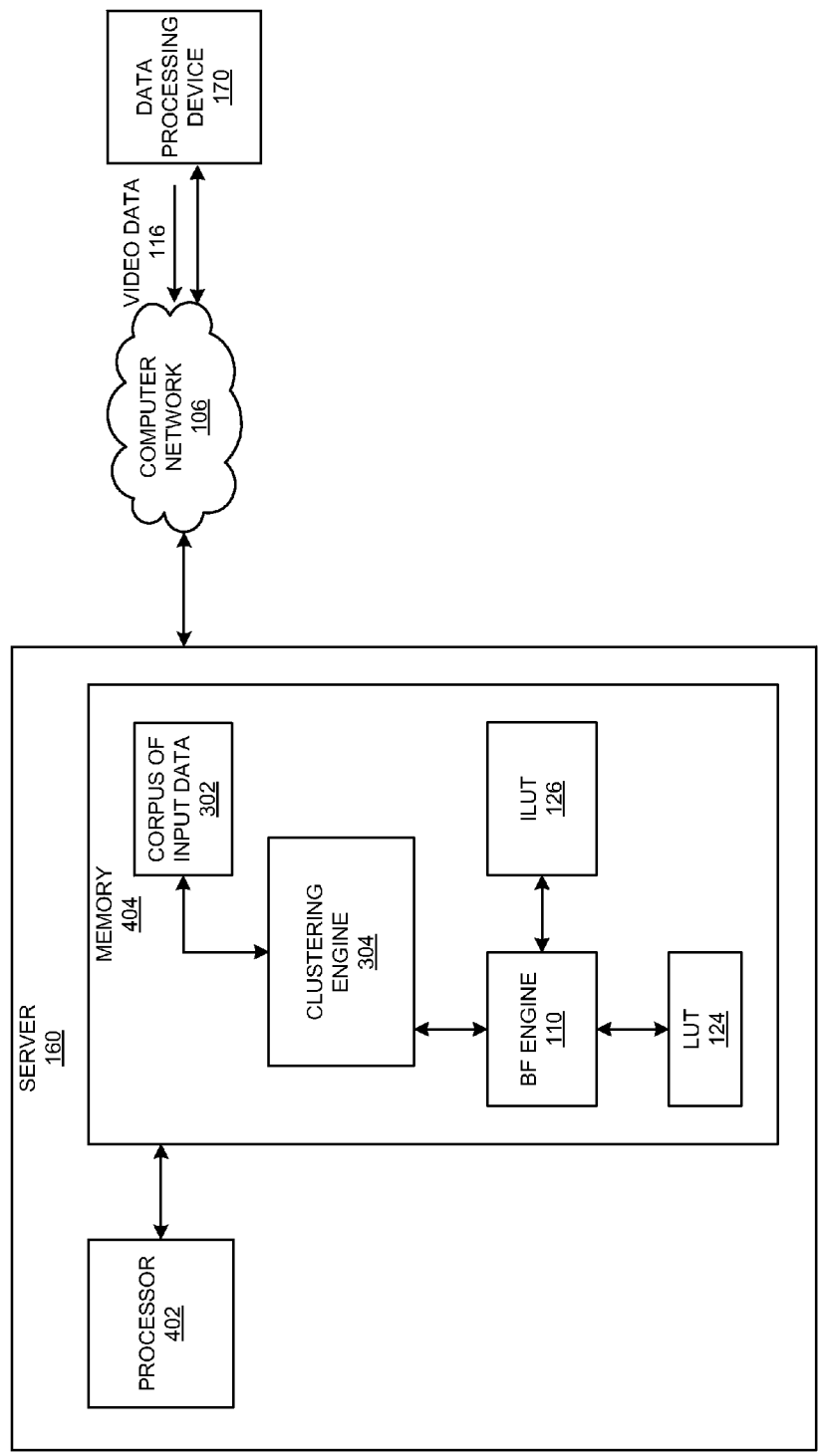
FIG. 4 is a schematic view of a server of the data processing system of FIG. 1 including a processor communicatively coupled to a memory, according to one or more embodiments.

FIG. 4 shows server 160 including a processor 402 communicatively coupled to a memory 404, in accordance with one or more alternate embodiments. Here, memory 404 may include BF engine 110 to be executed on processor 402, LUT 124 and/or ILUT 126. Data processing device 170 is shown as being communicatively coupled to server 160 through computer network 106 (e.g., Internet, a WAN, a LAN). In one or more embodiments, data processing device 170 may provide video data 116 to be filtered through server 160. FIG. 4 also shows clustering engine 304 and corpus of input data 302 as being stored in memory 404.

Last but not the least, the results of clustering engine 304 may be transmitted from server 160 to data processing device 170 to be utilized through BF engine 110 (see the embodiment of FIG. 1). Alternately, the results may be stored in memory 104 and/or made available on a non-transitory medium (e.g., storage medium) readable through data processing device 170 and/or server 160 such as a Compact Disc (CD), a Digital Video Disc (DVD), and a hard drive. Variations therein are within the scope of the exemplary embodiments.

It should be noted that utilization of fixed-point arithmetic may enable realization of a BF and all operations associated therewith in integer arithmetic; however, such an implementation may be computation/area expensive, whether in software or hardware. For example, a processor based on ARM architecture may consume several cycles for a division operation. Exemplary embodiments render the integer division redundant by:

a) effectively reducing the number of filter tap values through clustering; this reduces a size of LUT 124 by providing for a small number of possible combinations of the filter tap values, and b) providing for filter tap values with low bit-width; this provides for a small ILUT 126; the division operation may be reversed by bit-shifting discussed above.

In one or more embodiments, a combination of a) and b) may enable achieving ultra-low complexity normalization without sacrificing numerical precision.

Figure 5:
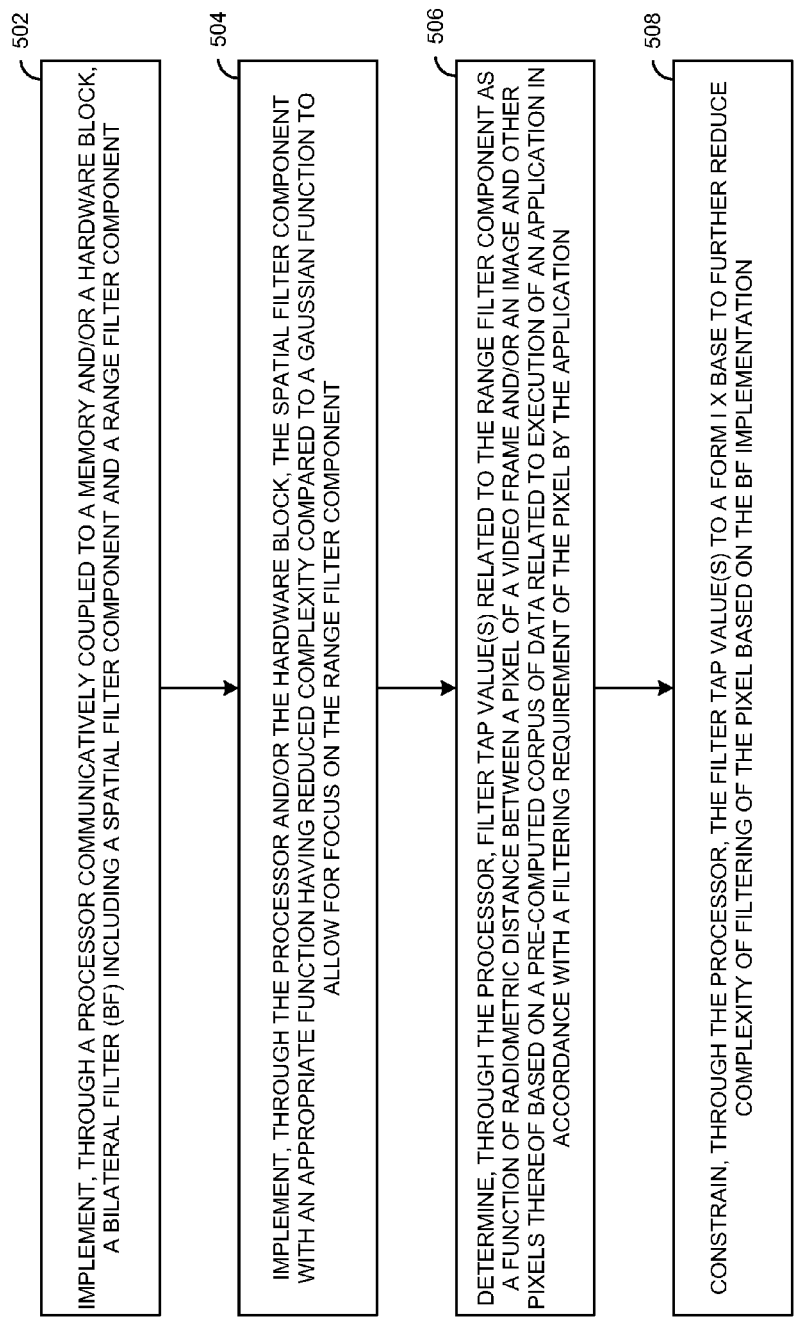
FIG. 5 is a process flow diagram detailing the operations involved in a low-complexity BF implementation in the data processing device of FIG. 1, according to one or more embodiments.

FIG. 5 shows a process flow diagram detailing the operations involved in realizing a low-complexity BF, according to one or more embodiments. In one or more embodiments, operation 502 may involve implementing, through processor 102 and/or a hardware block, a BF including a spatial filter component and a range filter component. In one or more embodiments, operation 504 may involve implementing, through processor 102 and/or the hardware block, the spatial filter component with an appropriate function having reduced complexity compared to a Gaussian function to allow for focus on the range filter component.

In one or more embodiments, operation 506 may involve determining, through processor 102, filter tap value(s) related to the range filter component as a function of radiometric distance between a pixel of video frame $122_{1-N}$ and/or an image and other pixels thereof based on a pre-computed corpus of data (e.g., pre-computed corpus of input data 302) related to execution of application 188 in accordance with a filtering requirement of the pixel by application 188. In one or more embodiments, operation 508 may then involve constraining, through processor 102, the filter tap value(s) to a form i×base to further reduce complexity of filtering of the pixel based on the BF implementation. In one or more embodiments, i may be an integer and base may be a floating point base.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a non-transitory machine-readable medium). For example, the various electrical structures and methods may be embodied using transistors, logic gates, and electrical circuits (e.g., application specific integrated (ASIC) circuitry and/or Digital Signal Processor (DSP) circuitry).

In addition, it will be appreciated that the various operations, processes, and methods disclosed herein may be embodied in a machine-readable medium and/or a machine accessible medium compatible with a data processing system (e.g., data processing device 170). Accordingly, the specification and drawings are to be regarded in an illustrative rather than a restrictive sense.

What is claimed is:

1. A method comprising:
   implementing, through at least one of a processor communicatively coupled to a memory and a hardware block, a Bilateral Filter (BF) comprising a spatial filter component and a range filter component;
   implementing, through the at least one of the processor and the hardware block, the spatial filter component with an appropriate function having reduced complexity compared to a Gaussian function to allow for focus on the range filter component;
   determining, through the processor, filter tap value(s) related to the range filter component as a function of radiometric distance between a pixel of at least one of a video frame and an image and other pixels thereof based on a pre-computed corpus of data related to execution of an application in accordance with a filtering requirement of the pixel by the application; and
   constraining, through the processor, the filter tap value(s) to a form i×base to further reduce complexity of filtering of the pixel based on the BF implementation, i being an integer and base being a floating point base.

2. The method of claim 1, further comprising separably implementing the spatial filter component of the BF through providing for the filtering of the pixel across one spatial dimension and filtering of a subsequent output of the range filter component across another spatial dimension.

3. The method of claim 1, further comprising at least one of:
   clustering, through the processor, the pre-computed corpus of data;
   steering, through the processor, a centroid of a cluster toward a specific filter tap value based on optimization therebetween; and
   limiting, through the processor, a number of the determined filter tap value(s) to a number of centroids determined based on the clustering.

4. The method of claim 1, further comprising at least one of:
   implementing, through the at least one of the processor and the hardware block, a normalization component of the BF to scale down an output of the range filter component by a normalization factor;
   implementing, through the at least one of the processor and the hardware block, a repository of inverse values related to the determined filter tap value(s) in the memory;
   optimizing, through the at least one of the processor and the hardware block, space consumed by the repository based on storing each entry of the repository as $2^k/i$, k being an integer chosen to enable storage of a maximum number of significant bits of the inverse value in the each entry;
   combining, through the at least one of the processor and the hardware block, data related to the most significant bits (MSB) of the each entry with the output of the range filter component; and
   bit-shifting, through the at least one of the processor and the hardware block, an output of the combination in accordance with the least significant bits (LSB) of the each entry to account for the normalization factor.

5. The method of claim 3, further comprising one of:
   providing the pre-computed corpus of data through a server to a data processing device comprising the processor and the memory;
   providing the pre-computed corpus of data to at least one of the server and the data processing device comprising the processor and the memory through a non-transitory medium readable therethrough; and
   executing the clustering on the at least one of the server and the data processing device.

6. The method of claim 4, comprising at least one of:
   storing the determined filter tap value(s) in a lookup table implemented in at least one of the memory and the hardware block; and
   implementing the repository of inverse values in one of: the lookup table and another lookup table.

7. The method of claim 1, comprising implementing the spatial filter component with a rectangular function as the appropriate function.

8. A data processing device comprising:
   a memory; and
   a processor communicatively coupled to the memory, the processor being configured to execute instructions to:
   implement a BF comprising a spatial filter component and a range filter component, implement the spatial filter component with an appropriate function having reduced complexity compared to a Gaussian function to allow for focus on the range filter component, determine filter tap value(s) related to the range filter component as a function of radiometric distance between a pixel of at least one of a video frame and an image and other pixels thereof based on a pre-computed corpus of data related to execution of an application in accordance with a filtering requirement of the pixel by the application, and constrain the filter tap value(s) to a form i×base to further reduce complexity of filtering of the pixel based on the BF implementation, i being an integer and base being a floating point base.

9. The data processing device of claim 8, wherein the processor is further configured to execute instructions to separably implement the spatial filter component of the BF through providing for the filtering of the pixel across one spatial dimension and filtering of a subsequent output of the range filter component across another spatial dimension.

10. The data processing device of claim 8, wherein the processor is further configured to execute instructions to at least one of:

receive an output of clustering of the pre-computed corpus of data, the clustering comprising steering of a centroid of a cluster toward a specific filter tap value based on optimization therebetween, and limit a number of the determined filter tap value(s) to a number of centroids determined based on the received output of the clustering.

11. The data processing device of claim 8, wherein the processor is further configured to execute instructions to at least one of:

implement a normalization component of the BF to scale down an output of the range filter component by a normalization factor, implement a repository of inverse values related to the determined filter tap value(s) in the memory, optimize space consumed by the repository based on storing each entry of the repository as $2^k/i$, k being an integer chosen to enable storage of a maximum number of significant bits of the inverse value in the each entry, combine data related to the MSB of the each entry with the output of the range filter component, and bit-shift an output of the combination in accordance with the least LSB of the each entry to account for the normalization factor.

12. The data processing device of claim 10, wherein one of:

the processor is configured to execute instructions to receive the pre-computed corpus of data through at least one of a server and a non-transitory medium readable therethrough, and the processor is configured to execute instructions associated with the clustering thereon.

13. The data processing device of claim 11, wherein the processor is configured to execute instructions to at least one of:

stored the determined filter tap value(s) in a lookup table implemented in the memory, and implement the repository of inverse values in one of: the lookup table and another lookup table.

14. The data processing device of claim 8, wherein the appropriate function is a rectangular function.

15. A system comprising:

at least one of a server and a storage medium comprising pre-computed corpus data related to execution of an application; and a data processing device communicatively coupled to the at least one of the server and the storage medium, the data processing device comprising a processor communicatively coupled to a memory, and the processor being configured to execute instructions to:

implement a BF comprising a spatial filter component and a range filter component, implement the spatial filter component with an appropriate function having reduced complexity compared to a Gaussian function to allow for focus on the range filter component, determine filter tap value(s) related to the range filter component as a function of radiometric distance between a pixel of at least one of a video frame and an image and other pixels thereof based on the pre-computed corpus of data in accordance with a filtering requirement of the pixel by the application, and constrain the filter tap value(s) to a form i×base to further reduce complexity of filtering of the pixel based on the BF implementation, i being an integer and base being a floating point base.

16. The system of claim 15, wherein the processor of the data processing device is further configured to execute instructions to separably implement the spatial filter component of the BF through providing for the filtering of the pixel across one spatial dimension and filtering of a subsequent output of the range filter component across another spatial dimension.

17. The system of claim 15, wherein at least one of:

at least one of the server and the data processing device is configured to cluster the pre-computed corpus of data, the clustering comprising steering of a centroid of a cluster toward a specific filter tap value based on optimization therebetween, and the processor of the data processing device is configured to limit a number of the determined filter tap value(s) to a number of centroids determined based on the clustering.

18. The system of claim 15, wherein the processor of the data processing device is further configured to execute instructions to at least one of:

implement a normalization component of the BF to scale down an output of the range filter component by a normalization factor, implement a repository of inverse values related to the determined filter tap value(s) in the memory, optimize space consumed by the repository based on storing each entry of the repository as $2^k/i$, k being an integer chosen to enable storage of a maximum number of significant bits of the inverse value in the each entry, combine data related to the MSB of the each entry with the output of the range filter component, and bit-shift an output of the combination in accordance with the LSB of the each entry to account for the normalization factor.

19. The system of claim 18, wherein the processor of the data processing device is further configured to execute instructions to at least one of:

stored the determined filter tap value(s) in a lookup table implemented in the memory, and implement the repository of inverse values in one of: the lookup table and another lookup table.

20. The system of claim 15, wherein the appropriate function is a rectangular function.

* * * * *